Nov. 1, 1966    S. G. FORBES ETAL    3,283,241
APPARATUS FOR FIELD STRENGTH MEASUREMENT OF A SPACE VEHICLE
Filed Oct. 5, 1962    3 Sheets-Sheet 1
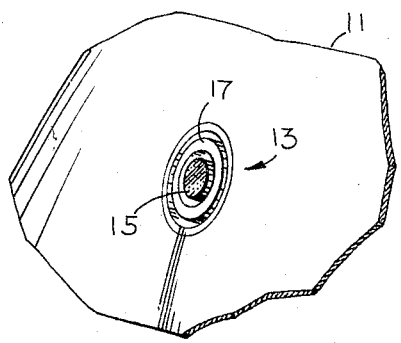
Fig. 1
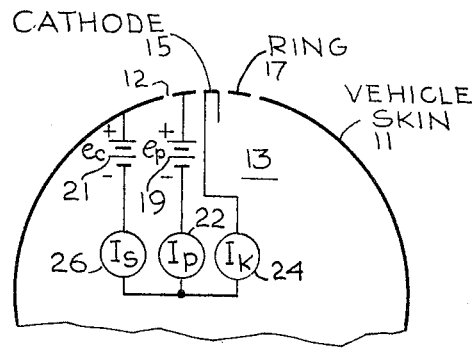
Fig. 2
Fig. 3
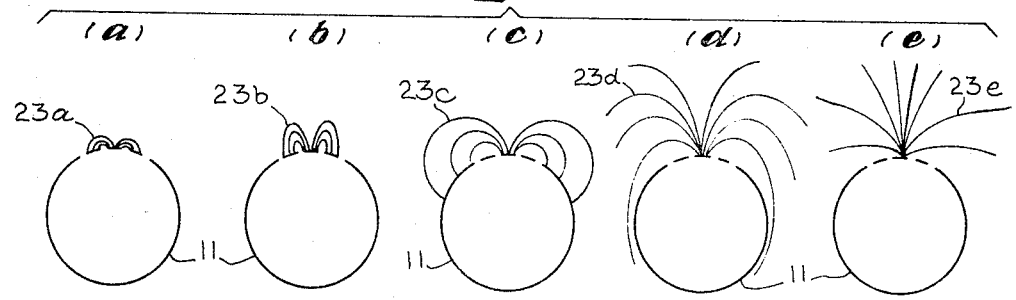
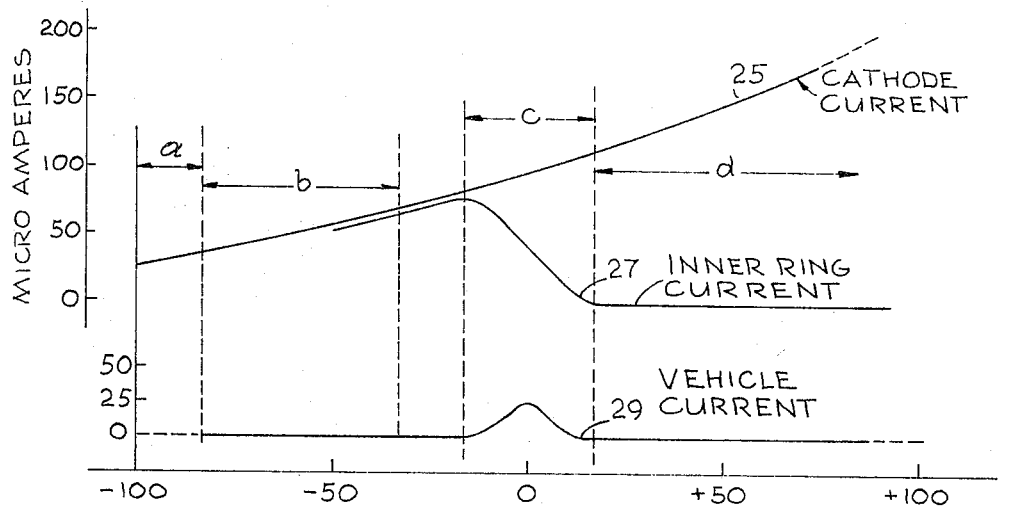
Fig. 4
STUART G. FORBES
ROBERT F. KEMP
JOHN M. SELLEN, JR.
INVENTORS
BY
Benjamin DeWitt
ATTORNEY

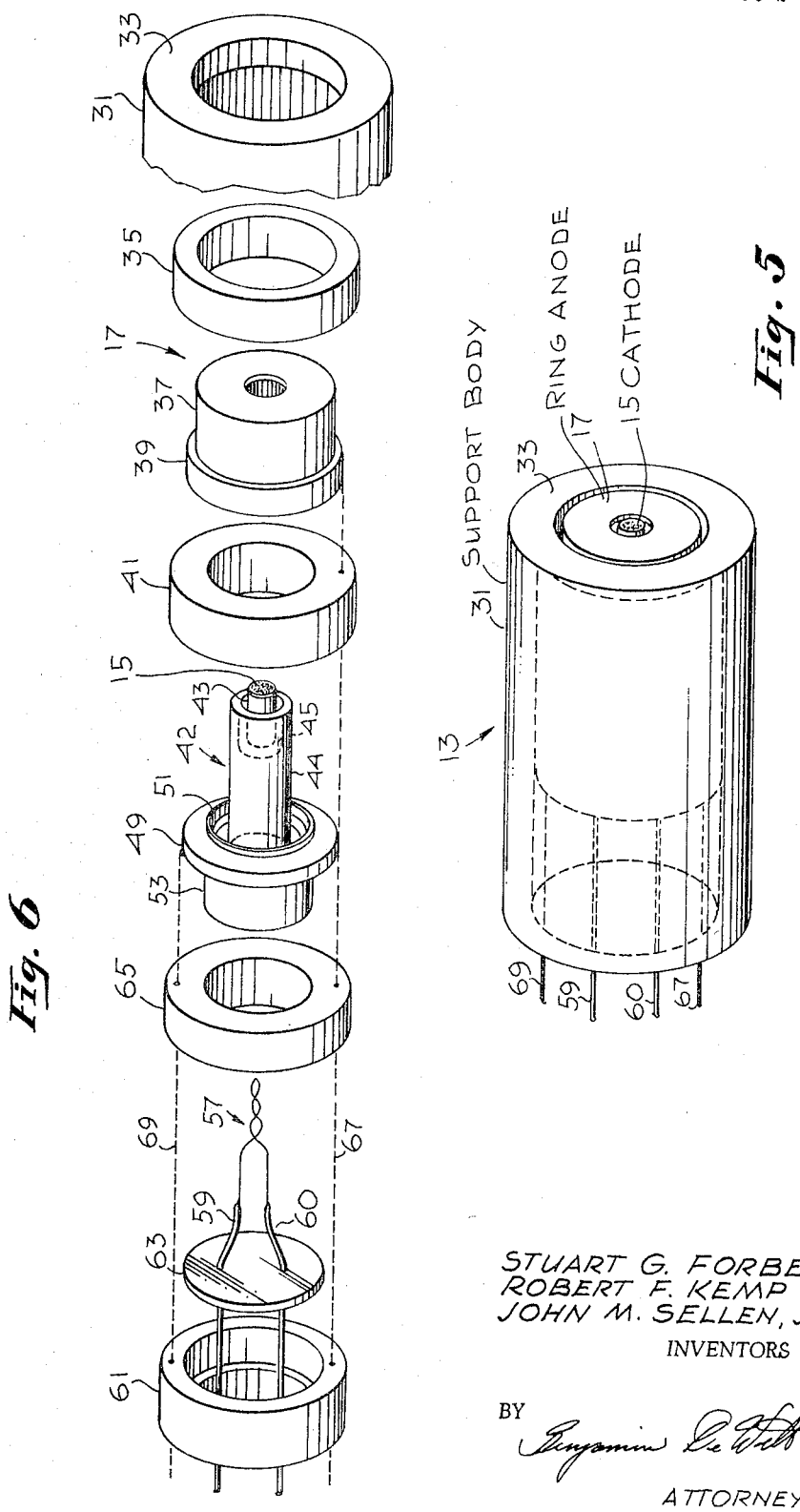

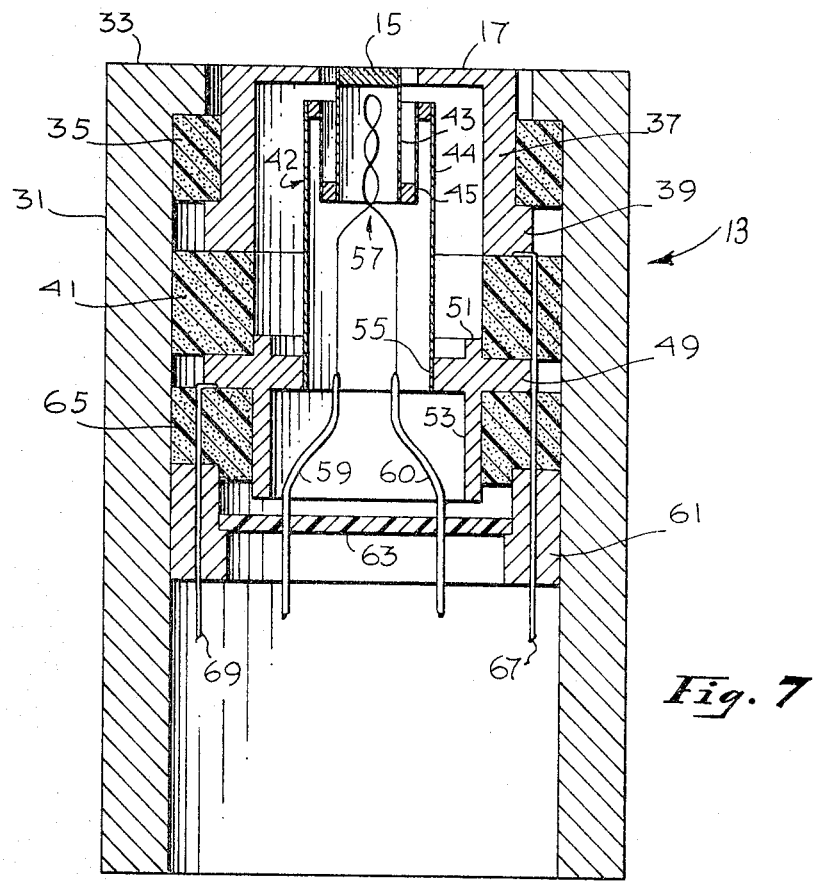

United States Patent Office 3,283,241
Patented Nov. 1, 1966

3,283,241
APPARATUS FOR FIELD STRENGTH MEASUREMENT OF A SPACE VEHICLE
Stuart G. Forbes, Palos Verdes, Robert F. Kemp, Redondo Beach, and John M. Sellen, Jr., Encino, Calif., assignors, by mesne assignments, to the United States of America as represented by the Administrator of the National Aeronautics and Space Administration
Filed Oct. 5, 1962, Ser. No. 228,569
3 Claims. (Cl. 324—32)

The present invention relates to electric field measurement apparatus and more particularly to systems for measuring the intensity of electrostatic fields in the vicinity of an isolated object.

Methods and apparatus of this general nature find one application in space vehicles of the general type discussed in an article entitled, "Electrostatic Propulsion," Proceedings of the IRE, volume 48, Number 4, April 1960, pages 477 through 491. A further and perhaps more detailed description of ionic propulsion systems which provides a background from which the present invention proceeds may be found in Space Technology, edited by Howard Seifert, John Wiley and Sons, Inc., New York (1959).

In space vehicles generally and particularly in vehicles employing ionic propulsion as described in the above-mentioned publications, one commonly encountered difficulty is that the vehicle may become electrostatically charged relative to plasma clouds or other material in the vicinity thereof. Such an electrostatically charged condition is undesirable in that it can result in deflection of the vehicle from the desired course as well as inefficient or ineffective operation of the propulsion engines. It is, therefore, desirable to provide, as a self-contained part of a space vehicle, an apparatus for continuously monitoring the strength of electrostatic fields which may exist in the vicinity of the vehicle. Moreover, measurement of the floating potential of an ion engine vehicle operating in space is an important function in that such measurement provides information concerning the electrical neutrality and stability of the ion beam exhaust. Such measurement can be made in the laboratory by conventional methods but is complicated in space because of the absence of a suitable reference body or potential level with respect to which the potential measurement can be made. Measurement of the electrostatically charged condition of an isolated object in space involves other difficulties which cannot be overcome by conventional electric field measuring techniques.

One prior art apparatus for measuring potentials is the so-called generating voltmeter which uses a rapidly rotating vane to repetitively expose the surface of a metallic plate first to a known electric field and then to the unknown electric field so that an alternating voltage is generated on the plate. That voltage is conventionally detected by means of high impedance amplifiers to provide a field strength indicative signal. The foregoing prior art apparatus is relatively unsuitable for use in space vehicles for a number of reasons. Firstly, in such apparatus an elaborate system is necessary to maintain the speed of the rotating vane at a constant value. Secondly, randomly fluctuating currents from the space plasma to a rotating vane electrometer would require that the device operate at an unusually high speed in order to generate an output signal stronger than the "noise" signal. The bearings of such a rotating member would either have to be protected by a vacuum seal or else designed to operate reliably in vacuo. In addition, rotating vane voltage meters tend to disturb the fields in the vicinity of a space vehicle and thereby may interfere with the vehicle propulsion system.

Another classical prior art method of measuring electrostatic fields involves the use of electroscope type devices. Such devices are relatively unsuitable for electrically propelled space vehicles for the reason that they are inherently high impedance devices. The indeterminate and variable currents which may flow to a space vehicle from the space plasma environment in which it operates will seriously interfere with measurements made by means of any high impedance, low current measurement apparatus. Reliable measurement and monitoring of electric fields in the vicinity of a space vehicle require low impedance apparatus which will tolerate relatively high current per unit area from the ambient plasma. This means that a desirable measuring apparatus should expose the smallest possible sensing area to the ambient plasma.

Accordingly, it is a primary object of the present invention to provide an improved apparatus for measuring the electrostatic field intensities in the vicinity of an isolated object.

It is a further object of the present invention to provide a low impedance apparatus for use in space vehicles for measuring the floating potential of the vehicle relative to the ambient plasma through which it travels.

It is a further object of the present invention to provide an electrostatic field measuring instrument of reduced weight, bulk, and power consumption for use in measuring electric fields adjacent the surface of a space vehicle.

To the foregoing general ends, in accordance with a preferred embodiment of the present invention, a thermionic cathode having a substantially planar electron emitting surface is constructed and arranged so that the emitting surface is exposed to the electrostatic fields adjacent the exterior surface of a space vehicle with the planar emitting surface lying substantially in the same plane as the surrounding vehicle skin. By such arrangement, the thermionic cathode is adapted to produce an electron space current which varies in amplitude as a function of the strength of the electric fields adjacent the surface of the vehicle. Appropriate circuit means is connected in a manner to be traversed by at least a portion of the electrons constituting the space current so that the circuit means may produce an output signal which varies as a function of the strength of the electrical fields of interest. More specifically, the apparatus of the present invention comprises, in a preferred embodiment, a flat circular electron emitting cathode surrounded by one or more coaxial ring anode electrodes. The cathode emits a fountain-like stream of electrons having trajectories dependent on the ambient field strength. As the floating potential of the vehicle becomes less positive relative to its environment, the length of the curvilinear trajectory of each electron tends to increase so that the electron current collected by any given anode ring will first increase as the diameter of the electron fountain moves outwardly to that ring and will later decrease as the electron trajectories move outwardly from that particular ring. Thus, the electron current collected by the anode rings may be utilized to provide a signal indicative of the ambient field strengths. Moreover, such a configuration has the advantageous property of symmetry about a central axis perpendicular to the cathode emitting surface so that first order cancellation of tangential field components is obtained. This feature is particularly advantageous in that it substantially eliminates distortion of the measurement by external magnetic fields.

The foregoing and other objects and features of our invention will be more apparent and better understood from the following description taken with the accompanying drawing, throughout which like reference characters indicate like parts, which drawing forms a part of this application and in which:

FIG. 1 is a perspective view of apparatus in accordance with the present invention mounted flush with the surface of a vehicle;

FIG. 2 is a diagrammatic illustration of the apparatus of FIG. 1 which is useful in explaining the concepts of our invention;

FIG. 3 is a diagrammatic illustration of various operating conditions in accordance with the invention;

FIG. 4 is a graphical illustration of the electrical characteristics of the apparatus illustrated in FIG. 1;

FIG. 5 is a perspective view of an electrostatic field measuring assembly;

FIG. 6 is an exploded perspective view of the assembly illustrated in FIG. 5;

FIG. 7 is a cross-sectional view of the assembly illustrated in FIG. 5; and

FIG. 8 is a schematic diagram of another embodiment of our invention.

A typical configuration of an apparatus in accordance with the present invention is illustrated in FIG. 1. The apparatus comprises a field measuring assembly 13 mounted in a circular aperture in the exterior surface or skin 11 of a space vehicle. The mounting is preferably such that the planar emitting surface of the thermionic cathode 15 is substantially coincident with the plane of the surface of the space vehicle. The circular thermionic cathode 15 is peripherally encompassed by a ring anode 17 which collects electrons emitted from the cathode surface 15 to an extent dependent upon the strength of the electrical fields in the immediate vicinity. FIG. 2 illustrates more clearly, in diagrammatical form, the essential operative structure of the apparatus of FIG. 1. The vehicle skin 11 is provided with an aperture indicated by the numeral 12 which coaxially receives the anode ring 17 and the cathode 15. A potential source 19 for positively biasing the anode 17 relative to the cathode 15 has its positive terminal connected to the anode 17 and its negative terminal connected, through a plate current measuring instrument or circuit 22 and through a cathode current measuring means 24, to the cathode 15. Additionally, cathode biasing potential source 21 may be connected in series with a "ship current" measuring means 26 between the skin 11 of the vehicle and the junction point between measuring instrument 22 and measuring means 24. It should be understood that the cathode biasing source 21 is not necessarily essential. Whether or not it is to be used and the magnitude of its output voltage will depend, in a particular embodiment, on the characteristics of the electrical propulsion engine which is used in the vehicle and on the preferred floating potential of the vehicle relative to its space environment. The field measuring ability of the apparatus illustrated in FIGS. 1 and 2 arises from the variations in electron trajectories which result from changes in the field strength. In the apparatus illustrated, the potentials between various elements are preferably arranged so that the ring anode 17 is positive with respect to the cathode and so that the cathode-anode assembly is negative with respect to the suface of the vehicle. Under those circumstances, when the external electrical field is zero, electrons emitted from the cathode 15 will be attracted to the positively charged surfaces of the anode 17 and will travel along the relatively short curved trajectories 23a as shown in FIG. 3a. Accordingly, the anode current, as measured by measuring means 22, will have a substantial value equal to the cathode current, as measured by instrument 24. When none of the emitted electrons are falling back to the ship's skin 11, the ship current $I_s$, as indicated by measuring means 26, will be zero. The currents $I_s$, $I_p$, $I_k$ are measurable aboard the spaceship. In the laboratory, currents which flow from the anode 17 to the simulated space environment can also be measured. The variations in the various currents which occur as the externally imposed electrical field strength changes are illustrated in FIGS. 3b through 3e, which show electron expulsion trajectories at different field strengths. When the vehicle is most positive relative to the space environment, the electron trajectories are held closely to the plane of the cathode 15 as shown in FIG. 3a and the current is almost entirely confined to the cathode-to-anode circuit. Under that condition, the magnitude of the cathode current is limited by the space charge in the anode-cathode region. Therefore, $I_p$ is equal to $I_k$ and both are relatively small. As the ship's potential becomes less positive, for example, by expulsion of an engine exhaust stream which is slightly positive rather than neutral, the trajectories of the electrons emitted by the cathode 15 become longer and higher as shown at 23b in FIG. 3b. That expansion of the electron trajectories reduces the space charge in the vicinity of the cathode and thereby permits the cathode current to increase. The cathode current is still collected entirely by the anode 17, however, and the cathode current is equal to the anode current. The operative condition corresponding to FIG. 3b is illustrated in the region b of FIG. 4. In FIG. 4 the floating potential of the space vehicle relative to its space environment is plotted as the abscissa, and the cathode current magnitude is plotted as the ordinate. Curve 25 indicates the cathode current, curve 27 indicates the anode current $I_p$ developed across plate resistance $R_p$, and curve 29 indicates the ship current $I_s$. In the region b corresponding to the condition of FIG. 3b, the cathode current curve and the anode current curve are substantially coincident and the ship current $I_s$ is zero.

As the positive potential of the ship is further reduced and approaches zero, the fountain-like electron beam emitted from the cathode 15 gradually switches over from the anode 17 to the ship's skin 11. This condition is best illustrated in FIG. 3c by the electron trajectories 23c. The field strength at which the current shifts from the anode to the ship's skin 11 can be controlled or adjusted by selecting the bias voltage provided by the cathode biasing source 21. As the vehicle becomes slightly negative relative to the space environment, some of the electrons emitted from the cathode 15 follow trajectories such that they leave the ship entirely and flow to infinity (that is, to the infinite current absorbing capacity of space) after first curling around the ship, as shown by the trajectories 23d in FIG. 3d. Under this condition, which is shown graphically by the region d of FIG. 4, the anode current $I_p$ and the ship current $I_s$ are both zero, the cathode current is relatively large, and the system as a whole can be regarded as a diode which has its anode at infinity.

The external electrical field strength in the vicinity of an isolated space vehicle can be measured and monitored by observation of the currents $I_s$, $I_p$, and $I_k$. First consider the cathode current $I_k$ as indicated by the curve 25 in FIG. 4. As the electrical field at the surface of the space vehicle gradually changes from positive to negative, the space charge in the vicinity of the cathode 15 gradually decreases and the cathode current increases correspondingly. If the cathode current is momentarily considered as analogous to the cathode-to-plate current in a conventional triode, then the cathode current characteristic is very similar to that of a triode but with the electrical field at the surface of the vehicle having an effect similar to the effect of a control grid located at infinity. When the space environment is negative relative to the vehicle, the anode 17 acts in a manner analogous to the plate of an ordinary triode and the plate and cathode currents are identical. As the space environment becomes more positive relative to the ship and moves through zero, the fountain-like electron beam gradually sweeps across the ring anode 17 and the anode current drops to zero as the electron beam moves over to the skin 11 of the vehicle. When a plurality of coaxial anode rings are used (not shown), the electron beam sweeps sequentially across the various ring anodes from the innermost anode to the outermost anode. Under that condition the negatively sloping portion of the anode current curve, as shown in the region d of FIG. 4, would occur at more positive potentials, that is, further to the right, for each successive ring anode. If multiple anode rings are used, each will show an increase in current followed by a decrease in current as the electron beam moves progressively outward from the central axis. The skin 11 of the vehicle has a current characteristic as illustrated by the curve 29 in FIG. 4. The ship's current $I_s$ first increases from zero to a maximum as the electron beam moves from the anode ring 17 to the ship's skin 11. The ship current $I_s$ later decreases as the electron beam expands further and leaves the ship entirely. FIG. 3e illustrates this latter condition wherein the space environment has a maximum positive potential relative to the vehicle. Under this condition all space current emitted by the cathode 15 flows directly to infinite space, and the anode ring 17 collects substantially no current even though it is positive with respect to the cathode.

As stated heretofore, the perturbing effects of magnetic fields on the apparatus of the present invention are substantially eliminated by using the measuring assembly 13 in which all components, including the anode 17 and the cathode 15, are symmetrical about the central axis of the cathode. We have found that the effect of a magnetic field on the apparatus as illustrated in FIGS. 1 and 2 is greatest when the magnetic field is parallel to the plane of the emitting surface of the cathode 15, that is, perpendicular to the axis of symmetry of the measuring assembly 13. In the preferred embodiment illustrated, the potential of the anode biasing source 19 determines the magnitude of the various currents $I_k$, $I_p$, and $I_s$. The potential of the cathode biasing source 21 can be adjusted to make the anode current characteristic symmetrical around the zero external field condition as shown in the region $c$ of curve 27 in FIG. 4. Since the negatively sloping portion of the anode current characteristic is relatively steep, the apparatus provides two sensitivity ranges. That is, the cathode current $I_k$ can be monitored to provide a wide range, low sensitivity output signal and the anode current $I_p$ can be measured to provide a narrow range, high sensitivity output signal when the apparatus is operating with external electrical fields as indicated by the region $c$ in FIG. 4. In a control system responding to the measuring apparatus of the present invention, the cathode output signal can be used for wide range "pull-in" of a servoloop and the anode current output signal may be used for narrow range control.

In FIGS. 5, 6 and 7, there is shown more explicitly the structural details of one form of practical apparatus employing the previously described measuring method of the present invention. FIG. 5 shows a cylindrical assembly 13 adapted to be mounted in a cylindrical aperture in the exterior surface of a space vehicle generally as shown in FIG. 1. The assembly 13 comprises a cylindrical support body 31 which encloses and retains a ring anode 17 and a centrally disposed cathode 15. A ceramic annulus 35 having a generally rectangular cross section is mounted internally of the support body 31 between the end flange 33 thereof and the exterior surface of the anode cylinder 37. The anode 17 is provided at its left-hand end, as shown in FIG. 6, with a flange portion 39 which is constructed and arranged to secure the anode between ceramic insulating rings 35 and 41, so that the anode is securely positioned and retained with respect to the support body 31 and is insulated therefrom. The anode 17 is centrally apertured to internally receive a re-entrant cathode-supporting cylinder 42 as best shown in FIG. 7. The cathode cylinder 42 is comprised of an inner cylindrical section 43 and an outer cylindrical section 44 which, together with an intermediate cylindrical section 45 disposed therebetween, form a reentrant structure supported at its lower end by base flange 49. The base flange 49 is provided with a short upwardly extending cylindrical section 51 and a longer downwardly extending cylindrical section 53 which, respectively, cooperate with insulating annular rings 41 and 65 to hold the cathode assembly in position relative to and insulated from the support body 31 and the anode flange 39. In accordance with conventional vacuum tube practice, the active end surface of the cathode 15 is preferably formed of barium impregnated porous tungsten. Alternatively, of course, it may be an oxide-coated type of cathode or other thermionic emitter. The thermionic cathode 15 is preferably maintained at emitting temperature by an internally disposed heater element 57 which may be of conventional construction and which is supported by a pair of heater lead-in rods 59 and 60. The rods 59 and 60 are in turn supported by a circular ceramic disc 63 which is apertured to receive the rods 59 and 60. The disc 63 is supported at its periphery by a heater assembly support ring 61 which engages and may be soldered to the inside wall of the cylindrical support body 31. The ceramic rings 35, 41 and 65, respectively, insulate the anode 17 from the support body and the cathode assembly from the anode and from the support body. Lead 67 is connected to anode 17, and lead 69 is connected to cathode 15 through base flange 49 whose inner surface 55 contacts cylindrical section 44 of the cathode. In addition, the ceramic rings accurately space the anode and cathode along the axis of the support cylinder 31 so that the active surface of the cathode is flush with the exterior of the anode ring and with the exterior end surface of said end flange 33 of the support body.

In accordance with the present invention, the re-entrant support structure for the cathode, comprising cylindrical sections 43, 44 and 45 functions to heat shield the cathode and thereby minimizes heater power requirements. The reentrant cathode support arrangement additionally increases the heat leakage path from the cathode as well as shielding against loss of heat by radiation. Another feature of cathode construction is concerned with electrical leakage between the cathode and heater. We have found that for space applications where minimization of heater power is important and preferably for such applications using the structure illustrated in FIGS. 5, 6 and 7, it is desirable to use isolated power supplies such as batteries for the cathode heater and the cathode-anode circuit. When isolated power sources such as batteries are used, no electrical leakage problem exists. However, if in a particular variant embodiment it is desired to ground the heater supply source to the vehicle, leakage currents from the heater to the cathode structure may become superimposed on the true cathode current and thereby create a spurious signal. Since the heater potential is of the order of ten volts in a preferred embodiment and since the space current emitted from the cathode is of the order of a few hundred microamperes, the leakage resistance from the heater to the cathode would have to be of the order of one to ten megohms in order to obviate significant error in the cathode current signal caused by heater-to-cathode leakage current. The ten megohm leakage resistance requirement exceeds that obtainable with the best available ceramics at the required operating temperature of the cathode. We have found that the leakage current problem may be solved by insertion of a grounded guard ring 71 between the heater and cathode as shown in FIG. 8. This alternative structural arrangement eliminates the leakage current problem by shunting any heater-to-cathode leakage current directly to the ship so that such leakage current does not flow through the cathode current measuring circuits. As shown in FIG. 8, the guard ring 71 is disposed between the heater 57 and the cathode 15 and is electrically connected to ground or a point of reference potential 73. The inadvertent leakage resistance between the guard ring 71 and the heater 57 is schematically illustrated as a resistance 75. Similarly, the leakage resistance which may occur between the guard ring 71 and the cathode 15 is schematically illustrated as a resistor 77. By consideration of FIG. 8, it may be appreciated that use of the grounded guard ring 71 causes any heater leakage current to flow only through a circuit from the heater supply source 79 to the heater 57 and thence to the guard ring 71 and back to the heater supply source 79. Thus, any leakage current which flows in response to the potential of the heater source 79 does not flow through the guard ring-to-cathode leakage resistance 77 and does not flow through the cathode load resistance $R_K$. The guard ring to cathode leakage resistance 77 is now in parallel with the cathode load resistor $R_K$, and $R_K$ can conveniently be made as small as a few hundred ohms. Accordingly, a leakage load resistance of about ten thousand ohms from the guard ring to the cathode is sufficiently high to avoid degeneration of the cathode output signal.

While the present invention has been illustrated and described with reference to certain preferred embodiments only it will be obvious to those skilled in the art that it is not so limited but is susceptible of various changes and modifications without departing from the spirit and scope thereof.

The embodiments of the invention in which an exclusive property or privilege is claimed are defined as follows:

1. Electric field measuring apparatus for use in a space vehicle having an exterior surface which is subject to accumulation of a substantial electrostatic charge relative to its environment so that an electric field exists adjacent the exterior surface thereof, said apparatus comprising:
   a component supporting body member adapted to be electrically connected to the exterior surface of said vehicle;
   a thermionically emissive cathode electrode having a substantially planar electron emitting surface for emitting, into said environment, an electron space current which varies as a function of the strength of electric field adjacent said emitting surface;
   an anode electrode extending peripherally around said cathode electrode and in the same plane for collecting a portion of the electrons constituting said space current;
   heater means connected to said cathode electrode to heat said cathode electrode so it will emit electrons;
   potential source means connected between said cathode electrode and said anode electrode in order to bias said anode electrode;
   said space vehicle connected to said component supporting body with its external surface substantially planar with said surface of said cathode electrode, and
   circuit means connected between said body member and one of said electrodes for producing an output signal which varies as a function of the electric field in the vicinity of said emitting surface.

2. A device, as set forth in claim 1, wherein said cathode electrode is provided with an external surface of disk shape, and said anode electrode's external surface is annular and coaxial relative to said cathode electrode.

3. A device, as set forth in claim 1, wherein said space vehicle is connected to said component supporting body with its external surface planar with said surface of said cathode electrode.

References Cited by the Examiner

UNITED STATES PATENTS

| | | | |
|---|---|---|---|
| 1,810,063 | 6/1931 | Thomas | 324—72 X |
| 2,204,196 | 6/1940 | Straatman | 324—30 X |
| 2,333,975 | 11/1943 | Bennett | 324—32 X |
| 2,650,343 | 8/1953 | Thompson | 324—30 |
| 2,872,638 | 2/1959 | Jones | 324—30 X |
| 2,969,058 | 1/1961 | Parton | 324—30 X |
| 3,022,430 | 2/1962 | Brown. | |
| 3,093,788 | 6/1963 | Linder | 310—3 X |

WALTER L. CARLSON, *Primary Examiner.*

FREDERICK M. STRADER, *Examiner.*

C. F. ROBERTS, *Assistant Examiner.*